No. 747,984. PATENTED DEC. 29, 1903.
W. LAY.
NUT LOCKING MEANS.
APPLICATION FILED APR. 30, 1903.
NO MODEL.
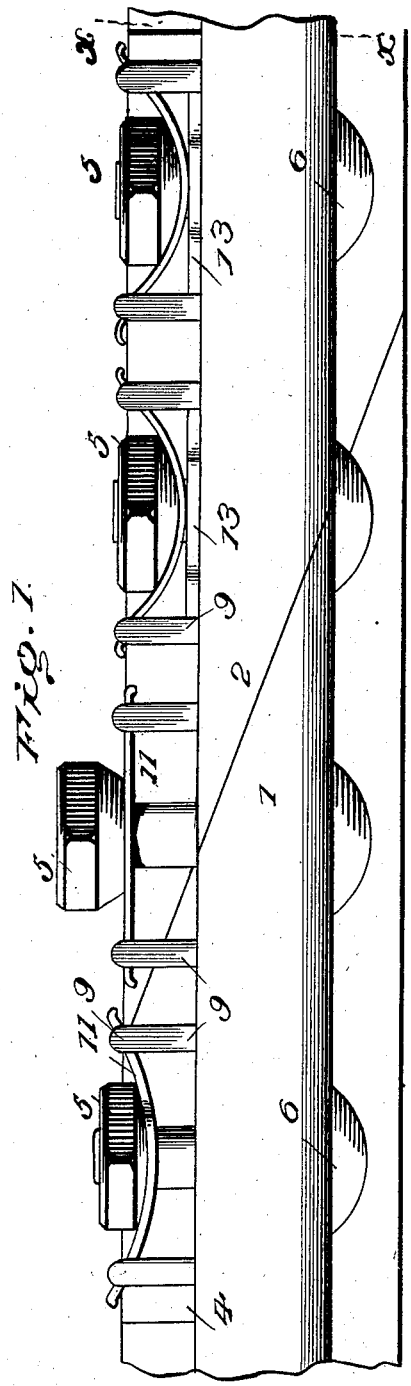
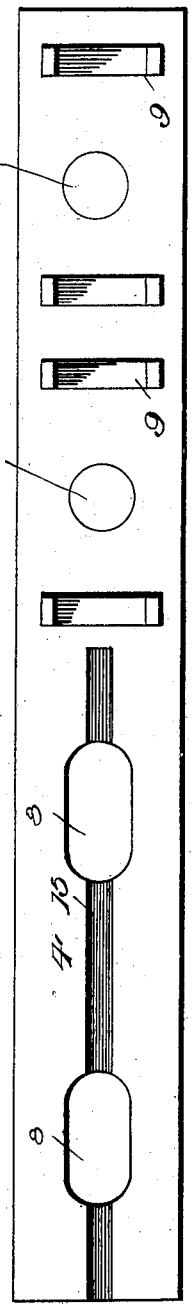
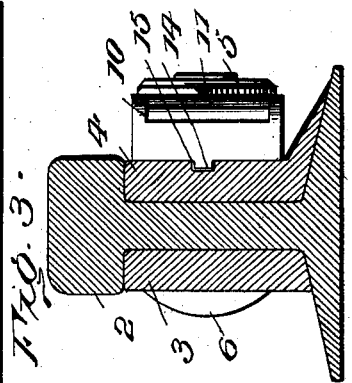
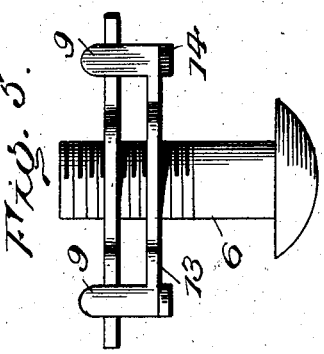
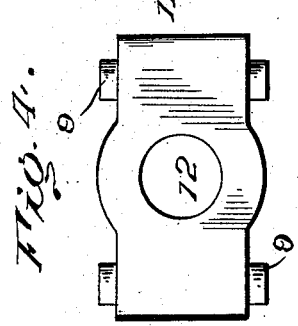
Witnesses
Inventor
W. Lay
By
Attorneys No. 747,984.                                       Patented December 29, 1903.

UNITED STATES PATENT OFFICE.

WILLIAM LAY, OF KREMLIN, OKLAHOMA TERRITORY.

NUT-LOCKING MEANS.

SPECIFICATION forming part of Letters Patent No. 747,984, dated December 29, 1903.

Application filed April 30, 1903. Serial No. 155,001. (No model.)

*To all whom it may concern:*

Be it known that I, WILLIAM LAY, a citizen of the United States, residing at Kremlin, in the county of Garfield and Territory of Oklahoma, have invented certain new and useful Improvements in Nut-Locking Means, of which the following is a specification.

This invention provides novel means for locking nuts of bolts from displacement due to the jar and vibration of the attaching parts to which same are applied. The means are preferably used in connection with joints for the meeting ends of rails. However, it is contemplated within the broad spirit of the invention that they may be utilized upon machinery and for other analogous purposes where, owing to vibration of parts, liability to disjointure of same is imminent.

The structure embodied by the invention prevents the inevitable creeping of the rails due to the variation in temperature and other climatic changes.

For a full description of the invention and the merits thereof and also to acquire knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a top plan view showing the relation of the parts in their preferable adaptation—namely, in connection with means for joining the ends of rails. Fig. 2 is a side elevation of the coöperating base or fish-plate. Fig. 3 is a sectional view about on a line X X of Fig. 1. Fig. 4 is a detail plan view of a lock-plate, showing relative disposition of the elastic washer member thereon. Fig. 5 is a detail view of the special form of nut-locking means.

Corresponding and like parts are referred to in the following description and indicated in all the views of the drawings by the same reference characters.

The invention is shown applied to joint means for connecting ends of rails, the peculiar form of joint being of the scarf type. The peculiar form of joint above mentioned does not form a part of the present invention, which embodies the special construction of the means for locking nuts to bolts, which will be more fully described hereinafter.

The rails are designated by the reference-numerals 1 and 2 and are scarfed at their meeting ends, as above premised. The ends of the rails are provided with the usual openings transversely therethrough. Fish-plates 3 and 4 are disposed upon opposite sides of the rail ends after the usual manner, one of these fish-plates being of the ordinary construction, the other, however, being made of a peculiar form, so as to coöperate with means to be clearly set forth by which the nuts 5 are held upon the bolts 6. It is usual in this construction of rail-joints to provide for the expansion and contraction of the rails by elongating the transverse openings 7, this permitting certain degree of movement of the rails toward and from each other even when the bolts are fastened in position. This invention, however, provides different means for accomplishing the above, the said means residing more especially in the construction of the fish-plates 3 and 4. These plates 3 and 4 are provided with openings 8, which register with the openings of the rail ends and which receive the fastening-bolts 6. Two of the openings 8 are circular in form, these being preferebly arranged near one end of each of the fish-plates, and the other two, oppositely disposed, are elongated, so as to permit of the expansion and contraction of the rails hereinbefore mentioned. The fish-plates are held rigidly with relation to the end of one of the rails; but owing to the form of the elongated openings at the opposite end portions thereof the end of a rail adjacent to the aforementioned is permitted to have a certain degree of longitudinal movement. The maximum and minimum lengths of these elongated openings being ascertained, the same are of a size sufficient to give necessary room when all the rails of the track are in their normal and proper place. By this means the rails of the track are adapted to adjust themselves, and the tendency to creep downgrade is remedied. This closes the joints and stops further movement of the rails at the bottom of grades, and consequently the force of expansion leaves the rails in their normal and proper location. This advantage is important in joints of this character.

The nut-locking means consists in detail of lugs 9, which are projected at intervals from one side of the fish-plate 4. These lugs are arranged in pairs, and the pairs of lugs 9 which coöperate with the bolts 6, passing through the circular openings in the end portions of the fish-plates, are preferably integral with the fish-plates 4. The lugs are notched, as shown at 10, intermediate either side, and these notches receive elastic washer members 11. The washer member 11 consists of a spring-plate, which is provided with a central opening, and in order not to weaken the plate the same may be slightly enlarged at the central point. The opening 12 of washer member is adapted to receive one end of a bolt 6. Upon application of the nuts 5 in securing the plates in position the same are screwed upon the side plates in the usual manner and coming into contact with the washer members 11 they cause the said members to spring inward to a degree depending upon the movement of the said nuts toward the fish-plate. The nuts are thus automatically locked by the washer members and are prevented from displacement by the friction contact therewith. For obvious reasons it is preferred the base portions of the nuts 5 be made of convex form by milling, filing, or forging same in the well-known manner. This gives a greater frictional contact-surface. To allow for the contraction and expansion of the rails, the lugs 9, which are adapted to coöperate with the nuts 6, adjacent to the movable rail ends, are projected from lock-plates 13. These lock-plates are prevented from vertical play by the provision of lugs 14, which extend from the under sides thereof into a longitudinal groove 15, which is disposed upon one end portion of the fish-plate 4, as shown most clearly in Fig. 3 of the drawings. The groove 15 is parallel with the edges of the fish-plate, as will be clearly seen, and merges into the elongated openings upon the fish-plate, as will be readily noted. The said groove allows for a certain amount of longitudinal movement of the lock-plate 13. It will be understood that the inventor is not necessarily restricted to the exact means for locking the lock-plates 13 from movement, but may adopt any suitable means consistent with the scope of the invention.

The operation of applying nuts to the bolts and the manner of locking them will be easily apparent to those skilled in this art in view of the foregoing description and need not be described.

Having thus described the invention, what is claimed as new is—

1. In means for locking nuts, the combination with a base-plate, a bolt extending therethrough, lugs extending laterally from said plate, an elastic washer member coöperating with the aforesaid extended lugs, and a nut adapted to be screwed upon the bolt coöperating with the said spring washer member.

2. In means for locking nuts and bolts, the same comprising a base-plate having lugs projected therefrom, and provided with openings disposed thereon to receive bolts, said openings being disposed between the lugs, a spring washer member having its end portions disposed upon the lugs, and a nut adapted to bear against the portion of the spring washer member disposed between the lugs.

3. In means for locking nuts the combination of a base-plate provided with openings thereon, lugs disposed upon opposite sides of the openings, bolts received by the openings, and a spring washer member provided with an opening to receive the bolt and having its end portions in engagement with the lugs, and a nut adapted to bear against for frictional engagement with the portion of the spring washer member disposed between the lugs.

4. In means for locking nuts to bolts, the combination with the base-plate provided with lugs projected therefrom, openings disposed between the said lugs and adapted to receive bolts, said lugs being provided with notches upon the end portions thereof, a spring washer member provided with the central opening to receive the bolt and having its end portions resting in the notches of the lugs and a nut adapted to be screwed upon the bolt for frictional engagement and coöperation with the central portion of the washer member.

5. In means for locking nuts and bolts, the combination with adjacent parts, of a base-plate connecting said parts, lugs projected from the end portion of the said base-plate, a spring washer-plate for coöperation with the aforesaid lugs and adjacent parts of the base-plate, the washer-plate being provided with openings to receive the bolts, lock-plates disposed upon the opposite end portion of the base-plate for longitudinal movement thereon and provided with openings therein, lugs projected from the lock-plates, spring washer members coöperating with the aforesaid lugs and provided with openings corresponding to the openings of the lock-plate, the portions of the connected parts adjacent the lock-plates being provided with elongated openings, bolts passing through the openings aforesaid, and nuts adapted to be screwed upon the ends of the bolts for frictional engagement with the spring washer members aforesaid.

6. In means for locking nuts, the combination with adjacent parts provided with a plurality of openings, of a base-plate provided with corresponding openings, lugs projected from one end portion of the base-plate, lock-plates disposed for longitudinal movement upon the opposite end portion of the base-plate, lugs projected from the aforesaid lock-plates, spring washer members for coöperation with the lugs upon the base-plate and upon the lock-plates and provided with openings, bolts passed through the openings in the parts aforesaid, and nuts adapted to be screwed upon the bolts for frictional contact and coöperation with the spring washer members.

In testimony whereof I affix my signature in presence of two witnesses.

WILLIAM LAY. [L. S.]

Witnesses:
T. M. BOYD,
J. S. GIFFORD.